Feb. 14, 1961     D. PROVENZANO     2,971,275
EDUCATIONAL TOY
Filed April 2, 1959

Dominick Provenzano
INVENTOR.

BY *Clarence A. O'Brien
and Harvey B. Jacobson*
Attorneys

United States Patent Office 2,971,275
Patented Feb. 14, 1961

2,971,275
EDUCATIONAL TOY
Dominick Provenzano, 4546 Malia St., Honolulu, Oahu, Hawaii
Filed Apr. 2, 1959, Ser. No. 803,630
5 Claims. (Cl. 35—31)

The present invention generally relates to an educational aid generally in the form of a toy which will aid one in learning more of a subject such as arithmetical problems and which is primarily concerned with self-teaching since only the proper answer can be placed in the area constructed for receiving the answer.

It is well known that a child may associate a shape or design with a similar shape or design much easier than they can associate number values and learn other problem solutions. Many attempts have been made to provide educational aids by employing various peg arrangements or the like but most of these devices fail due to the complexity thereof and the necessity of the child to have some one check his answers. Therefore, it is the primary object of the present invention to provide an educational aid which will also be amusing and useful as a toy in which certain problems are provided on a plate or the ilke with the area recieving the answer having a particular shaped or designed recess therein with there being provided blocks or small plates having the answers thereon together with a projection on the undersurface identical to the shape or design of the recess whereby only the proper answer block can be orientated in relation to the problem thus assuring that the answer will be correct. In the event the child does not know the answer or solution to a problem, he may turn the answer blocks over and compare the shape of the projection thereon with the shape of the recess in the plate thus enabling him to determine the correct answer block and enabling him to solve the problem without any side help which will not only stimulate his ability to learn but also provides certain benefits from the child solving his own problem.

A further object of the present invention is to provide an educational toy which is simple in construction, easy to use, extremely beneficial for educational purpose, amusing and entertaining, fool-proof, long lasting and generally inexpensive to manufacture.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1:
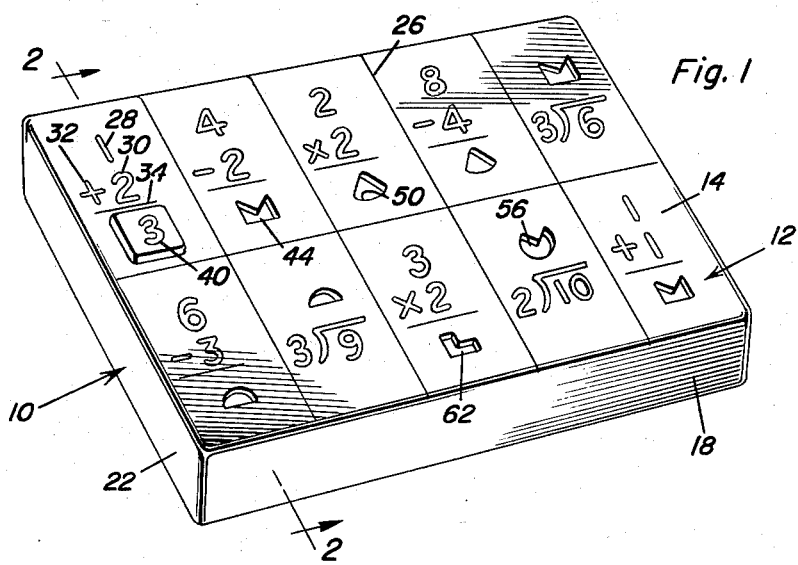
Figure 1 is a perspective view of the educational toy of the present invention.
Figure 2:
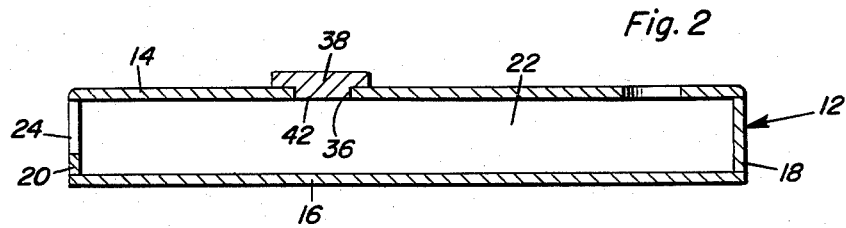
Figure 2 is a vertical sectional view taken substantially upon a plane passing along section line 2—2 of Figure 1 illustrating the details of construction of the device.
Figure 3:
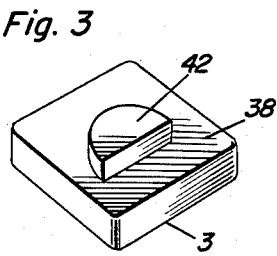
Figure 3 is a bottom perspective view of the No. 3 answer block.
Figure 4:
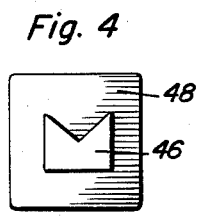
Figure 4 is a bottom plan view of the No. 2 answer block.
Figure 5:
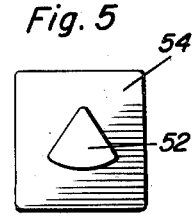
Figure 5 is a bottom plan view of the No. 4 answer block.
Figure 6:
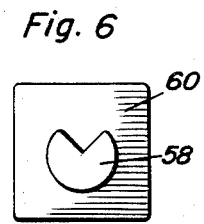
Figure 6 is a bottom plan view of the No. 5 answer block.
Figure 7:
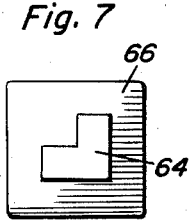
Figure 7 is a bottom plan view of the No. 6 answer block.

Referring now particularly to the drawings, the numeral 10 generally designates the educational aid of the present invention which includes a generally rectangular receptacle designated by the numeral 12 which includes a top plate 14 and a bottom plate 16, side end plates 18 and 20 and end edge plates 22. The side edge plate 20 is provided with a slot 24 therein which slot enables the answer blocks to be inserted into the receptacle 12 for storage thereof whereby the same will be readily accessible and will not become lost. It is noted that the slot has a bottom edge above the surface of the bottom 16 thus providing a retaining flange for retaining the answer blocks in the receptacle 12.

The upper surface of the top plate 14 is divided up into a plurality of areas by transverse and longitudinal dividing lines 26 thus providing a plurality of areas each of which is provided with a problem thereon and each of which is provided with an answer area thereon.

For example, in Figure 1 the problem at the upper left hand corner involves the addition of the numeral 1 and the numeral 2 which is disposed below the 1 and the addition sign is disposed to the left of the lower numeral which is numeral 2. The numeral 1 is designated by reference numeral 28 while the numeral 2 of the problem is designated by the reference numeral 30 and the addition sign is designated by reference numeral 32. A transverse line 34 is disclosed below the problem and generally separates the problem from the answer area which is disposed immediately below the problem. The answer area is provided with a recess or opening 36 which extends through the top plate 14.

The answer block disposed in the answer area includes a generally square block 38 which has the answer numeral 3 on the upper surface thereof which is designated by the numeral 40 and the lower surface of the block 38 is provided with a projection 42 which is the same shape and size as the aperture 36 for projecting into the aperture or opening 36 thus positioning and locking the answer block 38 in position. In this particular instance, the projection 42 is generally semi-cylindrical with the flat surface facing downwardly. The aperture 36 is similarly shaped and all of the blocks having the answer numeral 3 thereon wil have the same type of projection thereon and all of the answer areas will have the same shape and design opening therein. To the right of the problem just defined, it will be seen that the answer will be the numeral 2 and that an openinng 44 is formed in the answer area and this opening 44 is a particular shape and design which is the same shape and design as a projection 46 on the answer block 48 having the answer numeral 2 thereon. Where the answer numeral is 4, there will be a generally quadrant shaped opening 50 in the answer area which will receive a similarly shaped projection 52 on the answer block 54 having the answer numeral 4 on the face thereof. Where the answer numeral is 5, the opening is of a different shape and designated by the numeral 56 for receiving a similarly shaped projection 58 on the answer block 60 having the answer numeral 5 on the face thereof. Where the answer numeral is 6, a differently shaped recess 62 is provided in the answer area which may be generally L-shaped for receiving a similar projection 64 on the block 66 having the answer numeral 6 thereon. A different shape opening and projection may be provided for all of the integers and by combining these shapes, various rather difficult problems may be worked which may have answers of two or more digits since a plurality of openings or apertures may be provided in the answer area for receiving a plurality of answer blocks.

In order to limit the quantity of answer plates, various questions or problems can be made up on the question plate which will have the same answer thus requiring the same answer block or plate. Thus, there could be a number of problems and only several different types of answer blocks required such as in the illustration. Various combinations of problems can be made up and by repetition and association, one can more easily learn and understand arithmetical problems. The invention could be incorporated into an easel construction provided with removable plates and with more problems and the the same structural principle can be utilized for other subjects such as history, algebra, and any other subject where various questions are devised and answers may be provided. In each instance, it is only necessary to place a single answer block in position for answering the question.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. An educational toy comprising a generally plate-like member having a planar upper surface, said surface being divided into a plurality of problem areas with each area having indicia thereon forming a problem, said surface having a plurality of blank areas forming answer areas adjacent the problem areas, each answer area having a shaped recess therein with each different problem answer area having a different shaped recess, and a plurality of answer blocks for positioning in the answer areas with the answer blocks having indicia forming an answer on one surface thereof and a projection on the other surface thereof with the projection on the undersurface shaped identical to and having a size identical to the recess in the answer area which requires the answer indicia on that particular answer block for correct solution to the problem thereby preventing placement of an answer block having erroneous answer indicia thereon, in the answer area, each of said blocks having an identically shaped main body thereby requiring knowledge of the solution to the problem or comparison of the projection with the recess in order to properly place the answer block.

2. The structure as defined in claim 1 wherein said recesses are in the form of openings and said projections extend from the undersurface of the blocks.

3. The structure as defined in claim 2 wherein the problems are arithmetical and the answers are numerical indicia with the projections and recesses being geometrical figures.

4. The structure as defined in claim 3 wherein said plate-like member is provided with depending peripheral flanges forming side walls and end walls together with a bottom interconnecting the flanges thereby providing a receptacle, one of said flanges having a slot-like opening therein for receiving the answer blocks for storage thereof to prevent loss of the answer blocks.

5. In a problem and answer device, a generally rectangular plate having a plurality of problem forming indicia thereon, said plate having a plurality of blank areas in the area for receiving answers to the problems, each of said blank areas having a recess therein, the shape of the recesses being different for different solutions and being the same for the same solution even though the problem may be different, a plurality of answer blocks of identical over-all configuration, the upper surface of each answer block having answer forming indicia on the upper surface thereof, and a depending projection on the lower surface of each answer block with the projection corresponding with the shape of a recess requiring the answer forming indicia on the upper surface of the answer block thereby providing a solution for the problem, the projections on the answer blocks being the same when the numerical indicia on the upper surface of the answer blocks is the same whereby the answer blocks must be mated with the blank areas so that the projections are received within the recesses.

References Cited in the file of this patent
UNITED STATES PATENTS

| | | |
|---|---|---|
| 1,084,370 | Smith | Jan. 13, 1914 |
| 2,415,342 | Donner | Feb. 4, 1947 |
| 2,701,423 | Merrill | Feb. 8, 1955 |
| 2,839,843 | Keyko | June 24, 1958 |
| 2,892,267 | Harvey | June 30, 1959 |